US010514842B2

United States Patent
Kim et al.

(10) Patent No.: US 10,514,842 B2
(45) Date of Patent: *Dec. 24, 2019

(54) INPUT TECHNIQUES FOR VIRTUAL REALITY HEADSET DEVICES WITH FRONT TOUCH SCREENS

(71) Applicant: Adobe Inc., San Jose, CA (US)

(72) Inventors: Byungmoon Kim, Sunnyvale, CA (US); Jihyun Lee, Seoul (KR); Eunyee Koh, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/169,877

(22) Filed: Oct. 24, 2018

(65) Prior Publication Data
US 2019/0056861 A1 Feb. 21, 2019

Related U.S. Application Data

(63) Continuation of application No. 15/006,537, filed on Jan. 26, 2016, now Pat. No. 10,126,937.

(51) Int. Cl.
| | |
|---|---|
| *G09G 5/00* | (2006.01) |
| *G06F 3/0488* | (2013.01) |
| *G02B 27/01* | (2006.01) |
| *G06F 3/01* | (2006.01) |
| *G06F 3/023* | (2006.01) |

(52) U.S. Cl.
CPC ....... *G06F 3/04883* (2013.01); *G02B 27/017* (2013.01); *G06F 3/011* (2013.01); *G06F 3/0233* (2013.01); *G06F 3/0236* (2013.01); *G06F 3/04886* (2013.01); *G02B 2027/014* (2013.01);
(Continued)

(58) Field of Classification Search
CPC .. G06F 3/04883; G06F 3/0236; G06F 3/0233; G06F 3/011; G06F 27/017; G06F 3/04886; G06F 2027/0187; G06F 2027/014; G06F 2027/0178
See application file for complete search history.

(56) References Cited

U.S. PATENT DOCUMENTS

| | | | |
|---|---|---|---|
| 10,126,937 B2 * | 11/2018 | Kim | G06F 3/011 |
| 2012/0036469 A1 | 2/2012 | Suraqui | |

(Continued)

OTHER PUBLICATIONS

Notice of Allowance from related U.S. Appl. No. 15/006,537 dated Jul. 13, 2018, 10 pages.

*Primary Examiner* — Adam R. Giesy
(74) *Attorney, Agent, or Firm* — Kilpatrick Townsend & Stockton LLP

(57) ABSTRACT

Systems and methods for detecting a user interaction by identifying a touch gesture on a touch interface on a virtual reality headset. The touch gestures are received on a front surface that is on the opposite side of the headset's inner display screen so that correspondence between the touch location and displayed content is intuitive to the user. The techniques of the invention display a cursor and enable the user to move the cursor by one type of input and make selections with the cursor using a second type of input. In this way, the user is able to intuitively control a displayed cursor by moving a finger around (e.g., dragging) on the opposite side of the display in the cursor's approximate location. The user then uses another type of touch input to make a selection at the cursor's current location.

20 Claims, 6 Drawing Sheets

(52) U.S. Cl.
CPC ............... *G02B 2027/0178* (2013.01); *G02B 2027/0187* (2013.01)

(56) References Cited

U.S. PATENT DOCUMENTS

| | | |
|---|---|---|
| 2013/0335321 A1 | 12/2013 | Sugita |
| 2015/0253870 A1 | 9/2015 | Ikeda |
| 2015/0254471 A1* | 9/2015 | You .................... G06F 21/6218 726/19 |
| 2016/0224176 A1 | 8/2016 | Kim |
| 2016/0328082 A1 | 11/2016 | Argiro |

* cited by examiner

INPUT TECHNIQUES FOR VIRTUAL REALITY HEADSET DEVICES WITH FRONT TOUCH SCREENS

CROSS-REFERENCE TO RELATED APPLICATIONS

This application is a continuation of U.S. patent application Ser. No. 15/006,537, filed on Jan. 26, 2016, now allowed, the contents which is hereby incorporated by reference in its entirety for all purposes.

TECHNICAL FIELD

One or more embodiments of the invention disclosed herein relate generally to virtual reality devices and systems and methods for providing input to a virtual reality device. More specifically, one or more embodiments relate a touch interface on a touch surface of a virtual reality headset device for the purpose of providing input to the virtual reality headset device.

BACKGROUND

Virtual reality headset devices allow users to view media in an immersive environment. For example, virtual reality headset devices allow users to experience more complex and realistic environments by displaying two or three-dimensional content, or simulated three-dimensional content. To illustrate, many virtual reality headset devices are capable of displaying three-dimensional movies, video games, scenes, or simulations that allow users to interact with the virtual reality environment.

When interacting with a virtual reality environment, conventional virtual reality headset devices use a variety of different techniques for users to provide input to interact with a virtual reality environment. Specifically, some conventional virtual reality devices allow users to provide input by way of one or more cameras capturing a user's hand gestures, such as pointing gestures, pinching gestures, or hand movements. Hand gestures, however, require the use of cameras and large amounts of computation, which can reduce battery life and increase the costs associated with the virtual reality devices. Additionally, hand recognition is often not reliable, and hardware designed to recognize hand motions frequently fail to recognize or incorrectly interpret hand motions. Moreover, users often find the use of hand gestures as complicated, especially when there is a lack of an intuitive connection between a desired input and a corresponding hand gesture.

Alternatively, some virtual reality headset devices allow users to provide input to interact using touch gestures on small touch interfaces on the side of the headset. However, while using the side touch surface, users are unable to see their fingers, which are outside of the virtual reality headset device. Because users cannot see their fingers, conventional touch gestures and interpretation of gestures are less intuitive, more cumbersome, and otherwise undesirable. For example, on a touch screen device on a mobile phone, the user is able to look at the screen and their finger as the user taps on an icon on the screen to select the icon. In contrast, with a virtual reality headset with the image inside the headset and the finger outside the headset, the user in unable to see where the finger is in relation to the image. Moreover, the user is not tapping on the image itself so there is not intuitive understanding of where the user taps corresponding to something on the display. Existing touch techniques thus often do not work well for selecting displayed items and providing other types of user input on a virtual reality headset device. These and other disadvantages exist with respect to virtual reality user input techniques.

SUMMARY

As described above, existing touch techniques often do not work well for selecting displayed items and providing other types of user input on virtual reality headset devices. Embodiments of the invention disclosed herein address this and other problems by providing novel systems and methods for detecting a user interaction by identifying a touch gesture on a touch interface on a virtual reality headset. The touch gestures are received on a surface that is on the opposite side of the headset's inner display screen so that correspondence between the touch position and displayed content is intuitive to the user. The techniques of the invention display a cursor and enable the user to move the cursor by one type of input and make selections with the cursor using a second type of input. In this way, the user is able to intuitively control a displayed cursor by moving a finger around (e.g., dragging) on the opposite side of the display in the cursor's approximate location. The user then uses another type of input to make a selection at the cursor's current location. The use front touch, a displayed cursor, and the different types of input for movement and selection together provide easy, intuitive, and effective user interaction modalities.

One embodiment of the two-input type move/select technique is a one finger drag-and-tap technique in which dragging a finger moves the cursor and tapping makes a selection. The dragging roughly corresponds to the opposite side of the cursor that moves with the dragging movement on the viewable display screen. Drags are distinguished from taps based on touch duration and/or distance moved while touching. For example, a touch less than a threshold amount of time is considered a tap and a touch longer than the threshold amount of time is considered a drag.

Another embodiment of the two-input type move/select technique is a two finger technique. Using this technique the user drags a first finger, corresponding to the cursor location on the opposite side of the display, to move the cursor. A selection is made by tapping with a second finger while the first finger is still on the screen.

Additional embodiments involve alternative input techniques or combinations of techniques. For example, a user interface is configured to interpret one finger drag-and-tap input, two finger inputs, inputs on the side of touch devices, and/or voice input in various combinations. This flexibility allows a user to provide input via the input modality that best suits the user's preferences and/or the circumstances in which the user is using the virtual reality headset device.

Additional features and advantages of one or more embodiments of the present disclosure will be set forth in the description which follows, and in part will be apparent from the description, or may be learned by the practice of such example embodiments. The features and advantages of such embodiments may be realized and obtained by means of the instruments and combinations particularly pointed out in the appended claims. These and other features will become more fully apparent from the following description and appended claims, or may be learned by the practice of such example embodiments as set forth hereinafter.

BRIEF DESCRIPTION OF THE DRAWINGS

In order to describe the manner in which the above recited and other advantages and features may be obtained, a more particular description of embodiments systems and methods briefly described above will be rendered by reference to specific embodiments thereof that are illustrated in the appended drawings. It should be noted that the Figures are not drawn to scale, and that elements of similar structure or function are generally represented by like reference numerals for illustrative purposes throughout the Figures. Understanding that these drawings depict only typical embodiments and are not therefore to be considered to be limiting of its scope, the systems and methods will be described and explained with additional specificity and detail through the use of the accompanying drawings in which.

DETAILED DESCRIPTION

Figure 1:
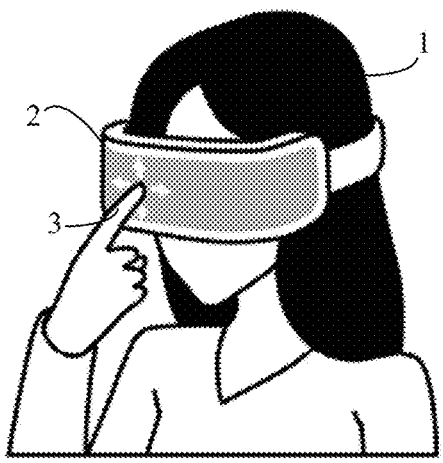
FIG. 1 illustrates an example of a user using a virtual reality headset device.

One or more embodiments of the present disclosure include a virtual reality headset device for providing a virtual reality environment to a user. The term "virtual reality environment" refers to any 2-dimensional or 3-dimensional content that is displayed to the user on a display screen proximate the user's eyes that the user is able to view and/or interact with. One or more embodiments of the virtual reality headset device allow a user to easily and intuitively provide a user interaction to perform one or more actions within a virtual reality environment. As used herein, the terms "user interaction" refer to a user providing a touch gesture to a touch interface. For example, touch gestures include, but are not limited to, one finger drag-and-tap gestures, two finger gestures, tap gestures, swipe gestures, pinch gestures, de-pinch gestures, single or multi-finger gestures, etc. As used herein, the term "touch interface" refers to a surface or region of the virtual reality headset device by which a user can provide a user interaction to the device. For example, a touch interface can include a physical touchpad or touch-sensitive surface on a portion of the virtual reality headset device. The virtual reality headset device can also include a processor to detect and interpret user interaction at the touch interface for a user to interact with the virtual reality environment.

In one example, a device includes a display screen secured to a housing frame and facing a pair of lenses on a first side of the display screen. The exemplary device includes a touch interface on an outer surface positioned on a second side of the display screen, where the second side is opposite the first side. Because the touch interface is opposite the display screen, the device receives user interactions in a way that is natural and intuitive to a user. To illustrate, as the device detects user interaction at the touch interface, the device generates a response on the display screen that corresponds with a position of the user interaction at the touch interface. In one or more embodiments, an area of the touch interface is mapped to an area of the display screen based on predetermined eye positions of a user.

In one or more embodiments, the device displays, moves, and makes selections using a cursor on the display screen. As used herein the term "cursor" refers to any type of graphical mark, highlight, or other indication of any shape, size, color, transparency level or other display characteristic that identifies a location or area on a display. In one embodiment, as a user applies a user interaction to the touch interface, the device detects the user interaction and displays a cursor in a location on the display device. In one example, the device displays a cursor on a displayed selectable element. Because the position of the user interaction on the touch interface corresponds to the location on the display screen that the cursor is displayed or moved to, the user is able to easily select elements without guessing where the user interaction will correspond on the display screen. The visual indication can also allow the user to easily locate the position of the user interaction relative to the display screen.

The techniques of the invention display a cursor and enable the user to move the cursor by one type of input and make selections with the cursor using a second type of input. In this way, the user is able to intuitively control a displayed cursor by moving a finger around (e.g., dragging) on the opposite side of the display in the cursor's approximate location. The user then uses another type of input to make a selection at the cursor's current location. In one embodiment, the user interaction is a drag and tap interaction using a single finger. In another embodiment, the user interaction is a drag and tap in which a user drags with one finger and taps with a second finger while the first finger is still in contact with the touch screen.

FIG. 1 illustrates an example of a user 1 using a virtual reality headset device 2. In this example, the user 1 wears the virtual reality headset device 2 to view content displayed on a display on the inside in front of the user's eyes. The user uses one or more fingers, such as finger 3, to provide user interactions on a touch surface on the front of the virtual reality headset device 2 opposite the displayed content so that correspondence between the touch position and displayed content is intuitive to the user 1. The user is able to intuitively control a displayed cursor by moving a finger 3 around (e.g., dragging) on the opposite side of the display in the cursor's approximate location. The user then uses the same or another finger to make a selection at the cursor's current location.

Figure 2:
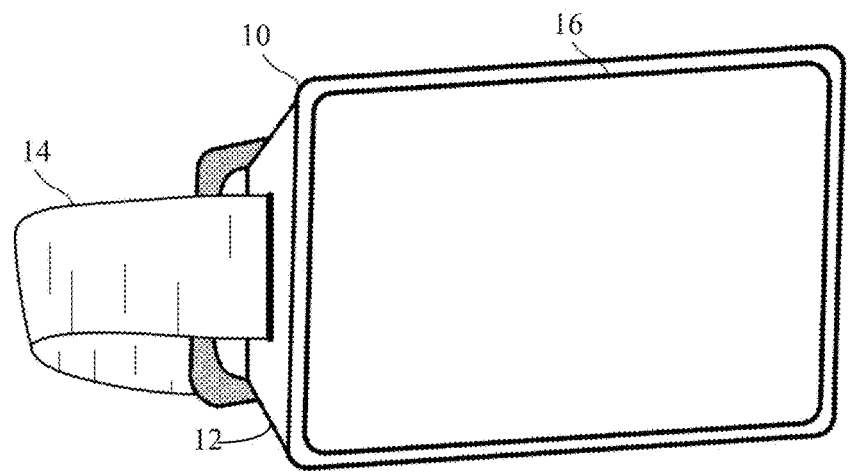
FIG. 2 illustrates an embodiment of a virtual reality headset device.

FIG. 2 illustrates another embodiment of a virtual reality headset device 10 (or simply, "VR device"). In one or more embodiments, the VR device 10 includes a housing frame 12, a support element (e.g., a strap) 14, and a touch interface 16. The VR device 10 also includes a display screen inside the housing frame 12, and a plurality of lenses (described in more detail in FIG. 3). In additional, or alternative, embodiments, the VR device 10 includes additional components, features, or capabilities. For example, the VR device 10 includes or allows other input devices, such as motion sensors, accelerometers, gyroscopes, cameras or handheld controllers.

As mentioned, the VR device 10 provides a virtual reality environment to a user. For instance, the VR device 10 displays a movie, panoramic scene, photographs or images, content browser (e.g., a photo or media content album), and/or a two or three-dimensional environment to the user via the display screen. In at least some instances, the VR device 10 allows the user to interact with the virtual reality environment by way of one or more input devices. For example, the user can change the view within the environment or move within the environment by moving his or her head or physically moving from one location to another (i.e., changing the position of the user's head laterally or vertically).

The VR device 10 also includes a support element 14 to hold the VR device 10 in place as the user views the virtual reality environment provided by way of the display screen. Specifically, the support element 14 can hold the VR device 10 in place so that the perspective of displayed content provided to the user is consistent. In one example, the support element 14 is a flexible strap. Alternatively, the support element 14 can be an adjustable support element 14 that allows the user to adjust the fit of the VR device 10 for comfort and stability.

In one or more embodiments, the VR device 10 allows the user to interact with the virtual reality environment and/or an operating system or other software by which the VR device 10 displays content. Specifically, a user interacts with the VR device 10 using the touch interface 16. The VR device 10 includes the touch interface 16 on a front, outer surface of the housing frame 12, as illustrated in FIG. 2. The touch interface 16 allows the user to use touch gestures to perform a variety of operations.

As previously mentioned, the touch interface 16 includes a touch sensitive region on the front, outer surface of the housing frame 12 that allows the VR device 10 to detect and interpret touch gestures from the user. For example, the touch interface 16 can communicate with a processor to detect and interpret a plurality of different touch gestures from a user. To illustrate, the user can perform a variety of single-touch or multi-touch gestures on the touch interface 16 to perform different operations. In one or more embodiments, the touch gestures include, but are not limited to, tap gestures using one finger, tap gestures using a plurality of fingers, swipe motions, pinch gestures, finger spread gestures, touch-and-drag gestures, touch-and-hold gestures, one finger drag-and-tap gestures; and two-finger drag-and-tap gestures.

Because the touch interface 16 can support a variety of touch gestures, a user is able to provide user interactions with the VR device 10 to perform a wide range of operations. For example, based on user interactions, a user selects, moves, edits, deletes or otherwise modifies elements displayed on the display device. In addition, user interactions are used to navigate through menus, to zoom in or zoom out, and otherwise change how content is displayed on the device.

Additionally, because the touch interface 16 is located on the front surface of the housing frame 12 of the VR device 10 opposite the display screen, the user can interact with the VR device 10 in a more intuitive way than with conventional touch interfaces on conventional VR devices. Specifically, because the touch interface 16 is located on the front surface of the housing frame 12 (e.g., parallel and in-line with the display screen), the user is more easily able to locate the user interaction relative to content displayed on the display screen than if the touch interface 16 is located on another area of the housing frame 12 that is not opposite the display screen.

In one or more embodiments, the VR device 10 generates a response on the display screen in accordance with a position of a user interaction on the touch interface 16. In some example embodiments, the VR device 10 maps an area of the touch interface 16 to an area of the display screen based on predetermined eye positions. In particular, the VR device 10 determines a plurality of predetermined eye positions corresponding to a left eye position and a right eye position. The VR device 10 uses the predetermined eye positions to determine a location on the display screen that corresponds to the user interaction at a position on the touch interface 16. In one example, the location on the display screen is determined based on the position of the user interaction at the touch interface 16, and an adjustment is applied based on the predetermined eye positions, such that the VR device 10 calculates the location on the display screen based on the position of the user interaction at the touch interface 16 relative to the predetermined eye positions.

In one or more embodiments, the VR device 10 uses predetermined eye positions that are customized for a particular user to determine the location on the display screen that corresponds to the user interaction at a position of the touch interface 16. For example, the user or another user (e.g., a device administrator) enters measurements for the user into the VR device 10 to allow the VR device 10 to calibrate the display screen and the touch interface 16 to the user. To illustrate, the VR device 10 calibrates a touch mapping between the area of the display screen and the area of the touch interface 16 based on measurements related to the predetermined eye positions for the user. The measurements include a distance between the user's pupils, a position of the user's pupils relative to each other or to other facial features, or a position of the user's pupils relative to one or more VR device components (e.g., the lenses). By configuring the VR device 10 based on a user's specific measurements, the VR device 10 customizes a configuration of the touch interface 16 and the display screen for a given user.

In one or more embodiments, the user (or another user) provides the measurements for the user to the VR device 10 by manually measuring and entering the measurements into a configuration interface of the VR device 10. In other embodiments the VR device 10 analyzes an image of the user to measure the user's facial features and determine the measurements for configuring the display screen and the touch interface 16. For example, the VR device 10 can capture or receive a photograph of the user and automatically determine the predetermined eye positions for the user without requiring the user to manually enter the measurements.

In one or more alternative embodiments, the VR device 10 uses predetermined eye positions based on average eye positions from a database or other data source. Specifically, the database includes average measurements for a left eye position and a right eye position based on measurements from a plurality of people. The VR device 10 uses the average measurements to configure the display screen and the touch interface 16 for use by any user of the VR device 10. Thus, the VR device 10 provides a single configuration that works with a plurality of users and does not use a special configuration for the user.

In one or more additional embodiments, the VR device 10 includes a plurality of preset configurations for the display screen and touch interface 16 so that the user is able to select the configuration that works best for the user. To illustrate, the user tests different configurations for providing user interactions to the display screen relative to the positions of the user interactions. Testing different configurations allows the user to identify a configuration for easily determining the position of the user interaction at the touch interface 16 relative to the corresponding location of the display screen.

In alternative embodiments, the corresponding location on the display screen is based solely on the position of the user interaction at the touch interface 16. This is referred to as "absolute" positioning. Specifically, the touch interface 16 provides the user interaction to the display screen based on a physical position of the user interaction at the touch interface 16 mapped to the display screen. For example, the VR device 10 identifies an (x, y) coordinate of the user interaction at the touch interface 16 and provides the user interaction to the display screen at an (x1, y1) coordinate mapped to the (x, y) coordinate of the touch interface 16. Thus, some embodiments of the VR device 10 may provide an indication of a user interaction on a location of the display screen independent of predetermined eye positions.

The touch interface 16 has a significant surface area. The position of the touch interface 16 at the front of the housing frame 12 can provide a substantially larger area for a touch surface than other locations on the housing frame 12 (e.g., on the side of the housing frame 12 where a user's temple is typically located). Thus, at least a portion of the front surface of the housing frame 12 can include the touch interface 16 to provide the user with a surface large enough to perform multi-touch gestures, as described above. In one example, the touch interface 16 covers almost all of the front surface of the housing frame 12, as illustrated in FIG. 2. In other embodiments, the touch interface 16 covers the entire front surface or only a small portion of the front surface of the housing frame 12. In one or more embodiments, the area of the touch interface 16 is larger or smaller than the area of the display screen.

In another embodiment, the touch interface 16 extends to other regions of the housing frame 12. Specifically, the touch interface 16 is located on more than one surface of the housing frame 12. In one example, the touch interface 16 extends from the front surface of the housing frame 12 to one or more sides of the housing frame 12 (including a top side and/or a bottom side of the housing frame 12). Extending the touch interface 16 past the edges of the front surface allows the user to provide user interactions in a greater number of locations on the VR device 10. Furthermore, a larger touch interface 16 that covers more than one surface of the housing frame 12 can improve the accuracy with which the VR device 10 is able to detect the position of the user interaction with respect to a location on the display screen.

The touch interface 16 can be any shape suitable to receiving user interaction from a user. For example, the touch interface 16 can include an approximately rectangular shape. In another example, the touch interface 16 can include a shape that fits to a front surface of the housing frame 12. To illustrate, the housing frame 12 (and thus, the touch interface 16) can include a front, outer surface that has one of a variety of shapes, including, but not limited to, a rectangle (as illustrated in FIG. 1) or other polygonal shape, an oval or circle, or a combination or plurality of various shapes.

In one or more embodiments, the touch interface 16 is the same shape and size as the display screen. In one example, the touch interface 16 and the display screen are both touchscreen devices (e.g., a smartphone), where a first touchscreen device is the display screen and a second touchscreen device is the touch interface 16. Alternatively, a manufacturer can manufacture the VR device 10 to include a touch interface 16 that is the same size as the display screen. In one or more alternative embodiments, the touch interface 16 and the display screen are different sizes and/or shapes.

Additionally, at least some embodiments of the touch interface 16 can include one or more curved surfaces. In particular, the housing frame 12 can include a surface that includes a curvature that maintains approximately the same curvature across the user's field of vision. In one or more implementations, the display screen may not follow the same curvature as the housing frame 12 due to the use of lenses to expand the field of view from the user's perspective. In other embodiments, the display screen also has the same curvature as the touch interface 16. As the user provides a user interaction at different angles relative to the predetermined eye positions, the user interaction feels and also appears to be at the same distance from the user's face based on the curvature of the surface and touch interface 16. Accordingly, the curved touch surface also provides a touch experience that extends to the full range of the user's vision, including at the periphery of the user's vision.

Figure 3:
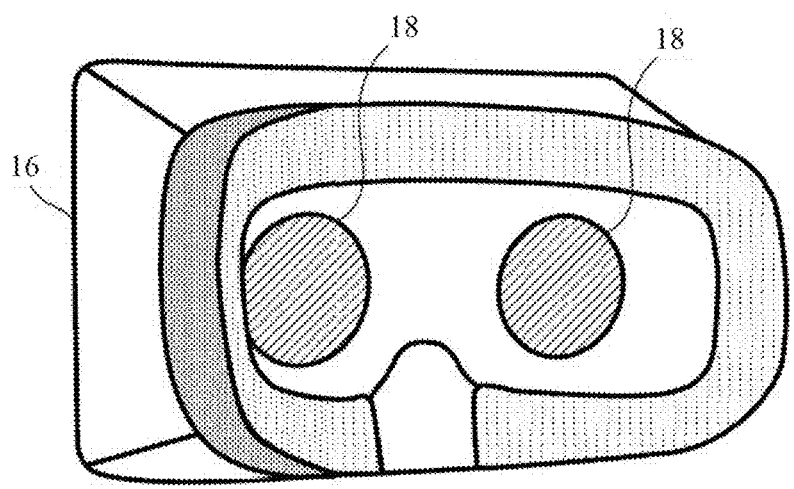
FIG. 3 illustrates another view of the virtual reality headset device of FIG. 2.

FIG. 3 illustrates an embodiment of the VR device 10 of FIG. 1. Specifically, FIG. 3 illustrates the housing frame 12 of the VR device 10 with a plurality of lenses 18. The lenses 18 modify how content on the display screen appears to the user. For example, the lenses 18 are positioned to correspond to the predetermined eye positions of the user, such that the housing frame 12 includes a left lens corresponding to the left predetermined eye position and a right lens corresponding to the right eye position.

The lenses 18 allow the VR device 10 to present an immersive virtual reality environment to the user that appears to extend to the periphery of the user's vision. To illustrate, as the user views the display screen within the housing frame 12 through the lenses 18, the VR device 10 uses algorithms to display content to the user in a way that makes the content appear to extend to the user's peripheral vision. Additionally, as the user provides user interaction to the touch interface 16, the VR device 10 also calculates the corresponding location on the display screen based on the presence and position of the lenses 18 within the housing frame 12. In one or more alternative embodiments, the VR device 10 includes a larger display screen that extends to the periphery of the user's vision without lenses 18. In such embodiments, the VR device 10 provides the user interaction to the display screen without having to account for the presence and position of lenses 18.

The user can select a selectable element by providing a user interaction (e.g. by providing a tap gesture) to the touch interface at a position corresponding to the location of the selectable element on the display screen. For example, as the user provides user interaction to positions on the touch interface, the VR device 10 can provide a response to the user interaction on the display screen so that it appears to the user that the user is interacting with a particular location on the display screen. Thus, the VR device 10 can configure the touch interface and the display screen so that the user can accurately predict the location of the user interaction without being able to see the touch interface.

In one or more embodiments, the VR device 10 provides an indication of the user interaction on the display screen. Specifically, as the user touches the touch interface, the VR device 10 displays the user interaction on the display screen to clearly indicate the location to the user. For example, the VR device 10 can display a visual indication of the user interaction, including, but not limited to, highlighting the location with a semi-transparent indicator (e.g., a circle), or using any other cursor. Thus, the user can easily locate the location on the display screen in accordance with the user interaction. In additional, or alternative, embodiments, the VR device 10 can provide tactile feedback to the user on the touch interface, play sounds, or provide other indications of the user interaction.

Figure 4:
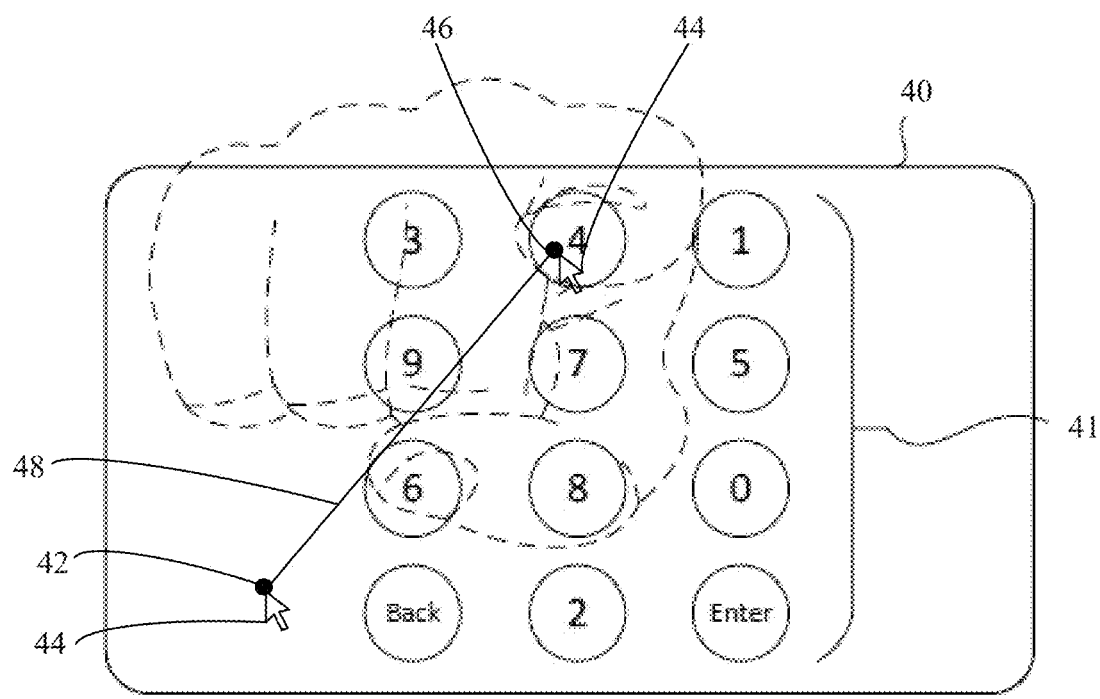
FIG. 4 illustrates an example of a single finger drag and tap input gesture.

FIG. 4 illustrates an example of a single finger drag and tap input gesture. In this example, display device 40 includes selectable display elements 41. In this example, the user touches a touch interface (not shown) with a finger on the opposite side of the display device 40. In this example, the user first touches the touch interface at a position corresponding approximately to location 42 on the display device 40. In response to this touch, a cursor 44 is displayed identifying the location 42 for the user to see. In another embodiment, the cursor was already displayed prior to the touch at the location 42 or elsewhere on the display device 40.

The user then drags the finger on the touch interface to a second position corresponding approximately to location 46 on the display device 40. During this dragging movement, the user sees cursor 44 move from location 42 along path 48 to location 46. The user then lifts the finger and taps back down on the touch interface. This touch can be, but need not be at a position on the touch interface corresponding to location 46 on the touch display 40. This touch is determined to be a tap. The tap is interpreted as a selection of whatever item the cursor is currently identifying.

In the drag and tap input gesture illustrated in FIG. 4, the user is able to interact with content displayed on display screen 40 without being able to see his or her fingers. The user's proprioception combined with the display of a curser and different types of input for cursor movement and cursor selection provides a convenient and easy way to for the user to interact with the user interface.

Figure 5:
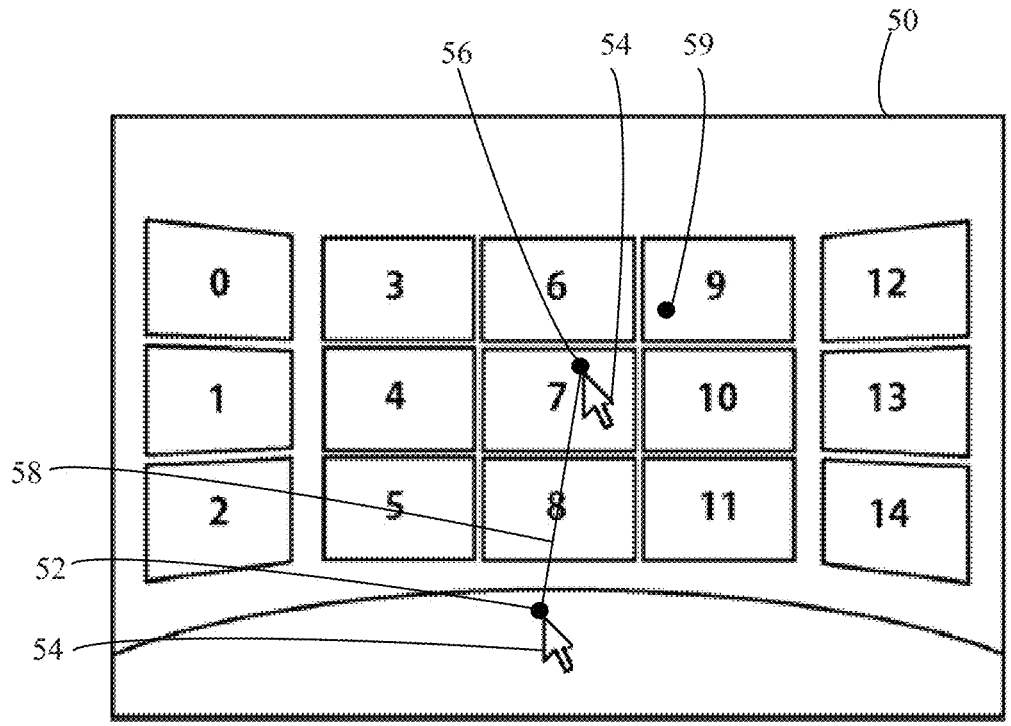
FIG. 5 illustrates an example of a two finger input gesture.

FIG. 5 illustrates an example of a two finger drag and tap input gesture. In this example, display device 50 includes selectable display elements 41. In this example, the user touches a touch interface (not shown) with a finger on the opposite side of the display device 50. In this example, the user first touches the touch interface at a position corresponding approximately to location 52 on the display device 50. In response to this touch, a cursor 54 is displayed identifying the location 52 for the user to see. In another embodiment, the cursor was already displayed at the location 52 or elsewhere on the display device 50.

The user then drags the finger on the touch interface to a second position corresponding approximately to location 56 on the display device 50. During this dragging movement, the user sees cursor 54 move from location 52 along path 58 to location 56. Leaving the finger on the touch surface at the position corresponding to location 56, the user touches the touch interface briefly at a location corresponding to location 59 with a second finger. This touch is determined to be a tap. The tap is interpreted as a selection of whatever item the cursor is currently identifying at location 56.

In the two finger input gesture illustrated in FIG. 5, the user is able to interact with content displayed on display screen 50 without being able to see his or her fingers. The user's proprioception combined with the display of a curser and different types of input for cursor movement and cursor selection provides a convenient and easy to use interface for the user. Moreover, the use of two different fingers for different input types is natural to many users familiar with moving a mouse device to move a cursor and using a finger to select something at a the cursor current location.

The illustrative techniques for interpreting user interactions illustrated in FIGS. 4 and 5, rely on proprioception rather than direct visual feedback because the user cannot see his or her fingers in relation to displayed content. The gestures supported by these techniques are superior to a simple tap selection gesture without a cursor and/or without dragging because the gestures supported by the techniques combine the user's proprioception of using dragging and tapping gestures on an opposite side of a display device with visual feedback showing a cursor reacting to those user interactions.

One embodiment further enhances the drag and tap and two touch techniques by avoiding jumping of an already-displayed cursor at the beginning of the user interaction. A user proprioception is not always perfect and a user will often touch a position on a touch interface on the opposite side of the device that does not exactly correspond to where the curser is actually displayed. This can result in the cursor jumping to a new position in a way that disorients the user. To address this, a relative matching technique is used. Unlike an absolute matching technique in which each data pixel has exact matching between the touch interface and the display screen, relative matching lets the user's initial touch (e.g., placing the finger down to start a drag) with current cursor location and then making subsequent movement relative to that position to location relationship. In another example, the error is identified and cursor position is adjusted slowly over time so the user does not experience a jump but the cursor is returned to an appropriate position over time.

Figure 6:
FIG. 6 illustrates displayed content including selectable letter options.

FIG. 6 illustrates displayed content 60 including selectable letter options. The drag and tap, two finger, and other input techniques used via a touch screen opposite a display screen on a virtual reality headset device are particularly useful with respect to user interactions with displayed content that includes numerous selectable icons such as displayed content 60, which includes numerous selectable letter options. In one embodiment, the user interface interprets a sequence of drag, drag and tap, or two finger user interactions using predictive techniques that identify intended words based on one or more letter selections.

The techniques disclosed herein facilitate fine, small scale interactions with content on virtual reality headset devices. Thus, if the complexity of the user interface increases (e.g. smaller, more packed buttons, etc.) users can handle the tasks with dexterity. The techniques are useful for example in facilitating interaction with displayed letters of the alphabet. Users are able to keyboard interactions with speed and confidence.

Figure 7:
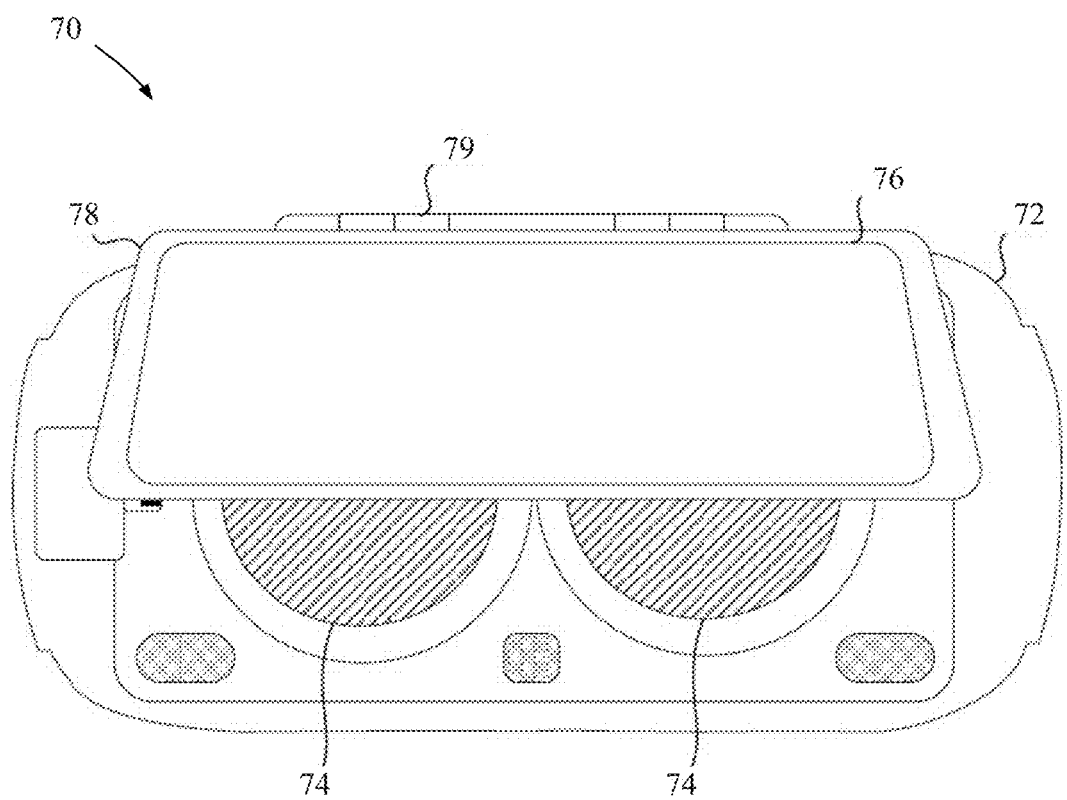
FIG. 7 illustrates an embodiment of a virtual reality headset device that includes a housing frame for attaching a display device, a plurality of lenses, and a touch interface.

The VR device 10 also includes a configuration in which the user provides the display screen and/or the touch interface. For example, FIG. 7 illustrates an embodiment of a VR device 70 that includes a housing frame 72, a plurality of lenses 74 (e.g., a pair of lenses), and a touch interface 76, but does not include a display screen. The VR device 70 may include a connector by which the user can connect a computing device with a display screen and a processor. For example, the user can connect a smartphone to the connector within the housing frame 72 such that the display screen of the smartphone is visible to the user through the lenses 74.

The VR device 70 includes a cover 78 that closes over the smartphone after installing the smartphone into the housing frame 72. Specifically, the cover can include the touch interface 76 that connects to the display screen of the smartphone after the user connects the smartphone to the housing frame 72 and closes the cover 78. For example, the cover 780 can include a hinge 79 that contains wires or other electronic components that allow the touch interface 76 to interact with the smartphone. Alternatively, the cover 78 and housing frame 72 can include compatible connectors that allow the user to snap the cover 78 onto the housing frame 72 and over the smartphone and to allow the touch interface 76 to interact with the smartphone.

Figure 8:
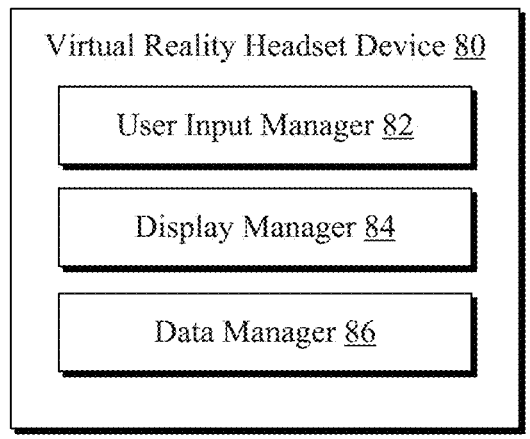
FIG. 8 illustrates components of an exemplary virtual reality headset device.

FIG. 8 illustrates a virtual reality computing device 80 ("VR computing device") that communicates with the touch interface and the display screen. The VR computing device 80 includes a user input manager 82, a display manager 84, and a data manager 86. Although the VR computing device 80 is depicted as having various components, the VR computing device 80 may have any number of additional or alternative components. For example, the VR computing device 80 can include a single processor or a plurality of processors in communication with the touch interface and the display screen.

In one or more embodiments, each of the components and subcomponents of the VR computing device 80 is in communication with one another using a suitable communication technology. It will be recognized that although the subcomponents of the VR computing device 80 are shown to be separate, any of the subcomponents may be combined into fewer components, such as into a single component, or divided into more components as may serve a particular implementation. Furthermore, although the components of FIG. 8 are described in connection with the VR computing device 80, at least some of the components for performing operations in conjunction with the VR computing device 80 described herein may be implemented on other devices. For example, the VR computing device 80 can be a processor in a smartphone or other handheld device that a user inserts into the housing frame of the VR device for providing a virtual reality environment to a user.

The components of the VR computing device 80 can include software, hardware, or both. For example, the components of the VR computing device 80 can include one or more instructions stored on a computer-readable storage medium and executable by one or more processors of the VR computing device 80. When executed by the one or more processors, the computer-executable instructions can cause the VR computing device 80 to perform virtual reality and touch interfacing processes described herein. Alternatively, the components of the VR computing device 500 can include hardware, such as a special purpose processing device to perform a certain function or group of functions. Additionally or alternatively, the components of the VR computing device 500 can include a combination of computer-executable instructions and hardware.

The exemplary VR computing device 80 includes a user input manager 82. Specifically, the user input manager 82 facilitates input by a user to interact with the VR device. For example, the user input manager 82 detects and interprets user interactions via a plurality of different input methods. To illustrate, the user input manager 82 manages user interactions from touch interfaces, controllers, cameras, accelerometers, gyroscopes, or other input devices of the VR device.

In one or more embodiments, the user input manager 82 also processes data associated with the position of the user interactions. For example, the user input manager 82 determines a position of each user interaction by the user on the touch interface. To illustrate, the user input manager 82 also determines the position of the user interaction at the touch interface relative to the predetermined eye positions. Thus, the user interface manager determines where the user is touching the touch interface relative to the location of the user's eyes. In alternative embodiments, the VR computing device 80 includes a separate component for determining the position of the touch interface relative to the predetermined eye positions.

The user input manager 82 also determines the type of an input. In one example, the user input manager 82 determines whether an input has a cursor movement types, such as a drag or reposition input, or a selection input type, such as a tap. The different input types are identified based on applying criteria to the observable characteristics of the user interaction. For example, if the user touch lasts more than a predetermined amount of time or moves a distance of more than a predetermined amount of distance on the touch surface, the user input manager 82 determines that the touch is a drag rather than a tap.

The exemplary VR computing device 80 also includes a display manager 84 to facilitate display of content on the display screen of the VR device. In particular, the display manager 84 identifies the content to display on the display screen and determines how to display the content on the display screen. Additionally, the display manager 84 communicates with the user input manager 82 to determine how the user input interacts with the content on the display screen. For instance, for a particular user interaction, the display manager 84 determines a location on the display device that is consistent with the position of the user interaction at the touch interface relative to the predetermined eye positions. Thus, the display manager 84 displays or otherwise provides user interaction (or inputs, as with multi-touch) to the display screen so that the user can easily understand where the user interaction will be on the display screen based on the position of the user interaction at the touch interface.

The exemplary VR computing device 80 also includes a data manager 86 to manage data that the other components in the VR computing device 80 use and/or produce. For example, the data manager 86 facilitates management of data associated with providing a virtual reality environment to the user via the VR device. Specifically, the data manager 86 communicates with the other components in the VR computing device 80 (i.e., the user input manager 82 and the data manager 86) to obtain data that the components have produced for storage and/or use by one or more of the components.

In one or more embodiments, the data manager 86 stores data that includes, but is not limited to, the predetermined eye positions, user input commands/actions, content for display on the display screens, user profile information, operating system information, and application information. For example, the data manager 86 communicates with the user input manager 82 to obtain user input data from the user input manager 82 for providing to the display manager 84. Additionally, the data manager 86 obtains the predetermined eye positions by way of manual entry or by automatic detection using the user input manager 82. The data manager 86 also stores user profile information for the user (or users), including password/security information, preferences, predetermined eye positions, and/or other information about the user that the VR device can use in providing the virtual reality environment to the user. The data manager 86 also stores operating system and application information for providing a user interface to the user.

FIGS. 1-8, the corresponding text, and the examples, provide a number of different systems and devices for providing a virtual reality environment to a user of a VR device. In addition to the foregoing, embodiments can be described in terms of flowcharts comprising acts and steps in a method for accomplishing a particular result. For example, FIGS. 9 and 10 illustrate flowcharts of exemplary methods in accordance with embodiments of the invention.

Figure 9:
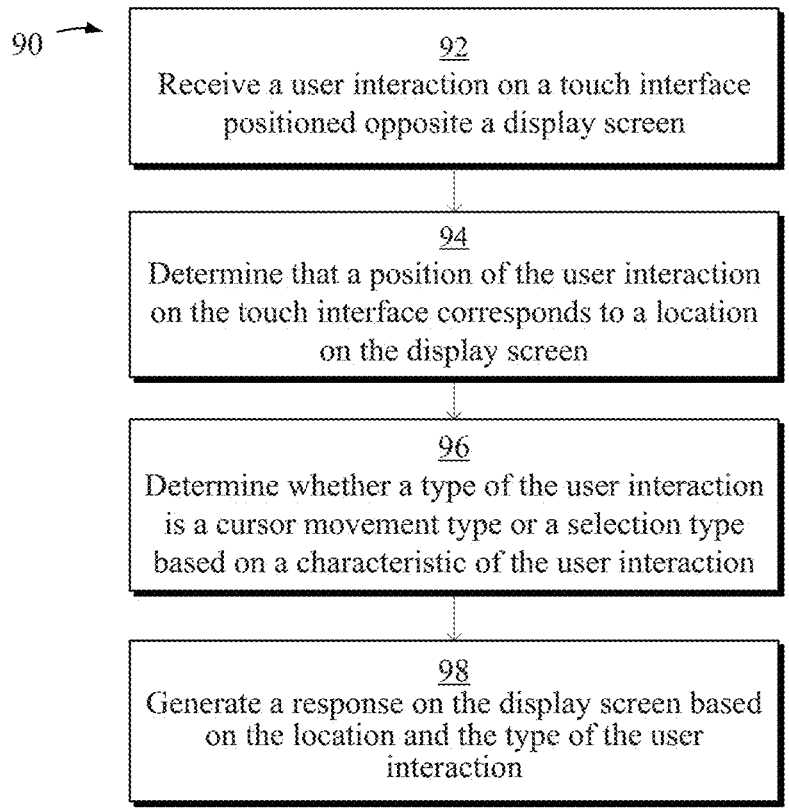
FIG. 9 illustrates a flowchart of a series of acts in an exemplary method of responding to user interaction using a virtual reality headset device.
Figure 10:
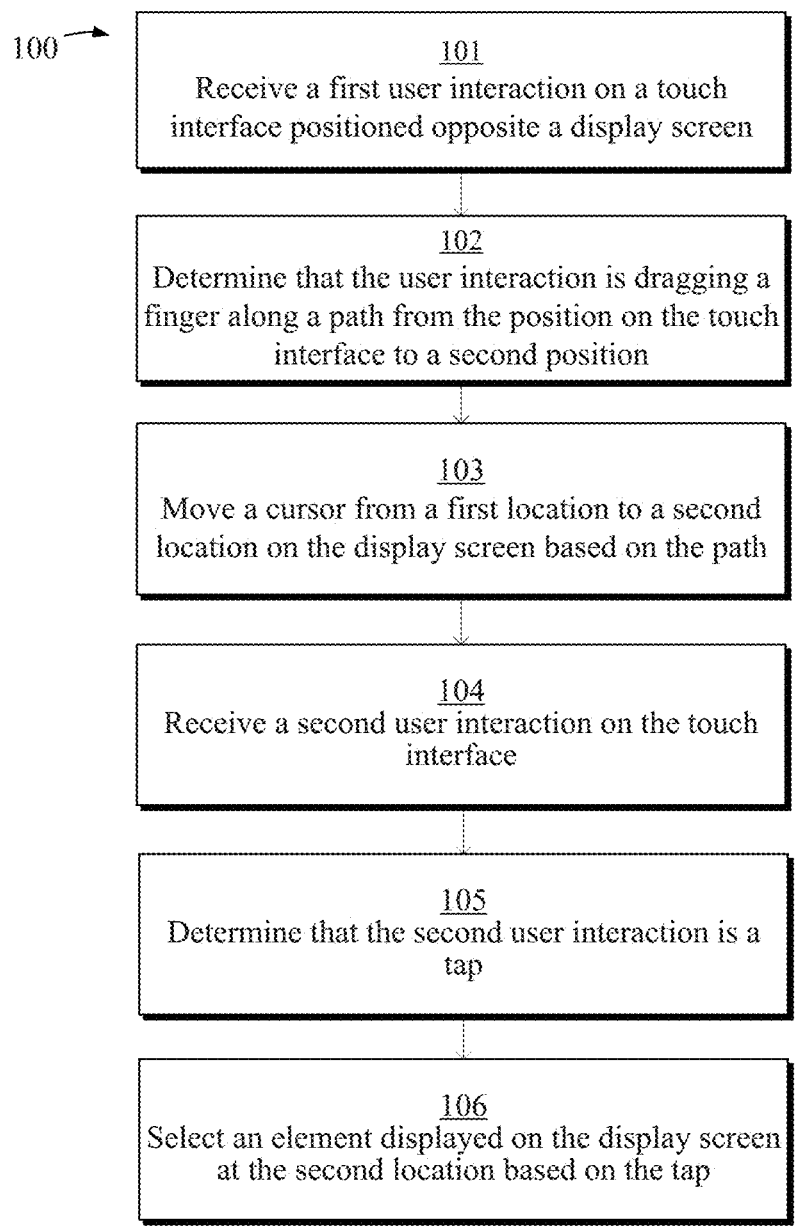
FIG. 10 illustrates a flowchart of a series of acts in an exemplary method of responding to user interaction using a virtual reality headset device.

FIG. 9 illustrates a flowchart of a method 90 of providing user input using a virtual reality headset device. The method 90 includes an act 92 of receiving a user interaction on a touch interface positioned opposite a display screen. The display screen and touch interface can be flat, curved, or any other shape. The user interaction can involve touches made by one or more fingers, one or more stylus or pen style devices, or indirectly through gloves or other implements. The virtual reality headset displays world-fixed content in one embodiment and displays view-fixed content in another embodiment.

The method 90 includes an act 94 of determining that a position of the user interaction on the touch interface corresponds to a location on the display screen. This can involve mapping coordinates on the touch interface to coordinates on the display screen. Alternatively, the correspondence can be based on identifying a location based on the touch, a prior cursor position, and/or the user's eye focus. In one embodiment, determining that the position of the user interaction on the touch interface corresponds to the location on the display screen involves matching the position of the user interaction relative to predetermined eye positions. In another embodiment it involves using an absolute mapping technique. In another embodiment it involves using a relative mapping technique.

The method 90 includes an act 96 of determining whether a type of the user interaction is a cursor movement type or a selection type based on a characteristic of the user interaction. For example, a cursor movement type includes repositioning a cursor from one position to another using a drag movement. The type of interaction is determined using a characteristic of the user interaction such as the number of fingers, the duration of the touch, the length of movement of the touch, a change in the number of fingers touching, or any other appropriate characteristic of the user interaction.

The method 90 includes an act 98 of generating a response on the display screen based on the location on the display screen and the type of the user interaction. For example, if the type of the user interaction is a cursor movement, the response includes moving the curser from one location to another location on the display screen. In another example in which the type of the user interaction is a selection type, the generated response is a selection of an element on the display screen at the cursor's current location.

In one example, method 90 involves determining that the user interaction is dragging a finger along a path from the position on the touch interface to a second position on the touch interface, moving a cursor from the location to a second location on the display screen based on the path, determining that a next user interaction is a tap, and selecting an element displayed on the display screen at the second location based on the tap. This one finger drag and tap input technique provides an intuitive and easy way for a user to select an item on a virtual reality headset device without being able to see his or her fingers relative to the displayed elements.

In another example, method 90 involves determining that the user interaction is dragging a finger on the touch interface, moving a cursor on the display screen based on the dragging, determining that another user interaction with the touch interface is a tap made using another finger while the finger is still detected on the touch screen, and selecting an element displayed on the display screen at a current cursor location based on the tap. This two finger cursor movement and selection technique also provides an intuitive and easy way for a user to select an item on a virtual reality headset device without being able to see his or her fingers relative to the displayed elements.

Other types of input can additionally or alternatively be used. In one example, drag and tap, two finger, pinch to zoom, and swipe to scroll input modalities are used together so that a user can use a modality that is best suited for the user's preferences or the circumstances of use. Similarly, one embodiment provides an interface that allows a user to customize the input modality to suit the user's preferences.

FIG. 10 illustrates a flowchart of a method 100 of providing user input using a virtual reality headset device. The method 100 includes an act 102 of receiving a first user interaction on a touch interface positioned opposite a display screen of the virtual reality headset device. The method 100 includes an act 104 of determining that the user interaction is dragging a finger along a path from the position on the touch interface to a second position on the touch interface. The method further includes an act 106 of moving a cursor from a first location to a second location on the display screen based on the path. The method 100 further includes act 108 of receiving a second user interaction on the touch interface and act 110 of determining that the second user interaction is a tap. An element displayed on the display screen at the second location is selected based on the tap in act 112. In one embodiment, the second user interaction is determined to be a tap based on the second user interaction occurring after the first user interaction concludes and based on a length of time the second user interaction occurs or on a distance of movement of the second user interaction on the touch interface. In another embodiment, the second user interaction is determined to be a tap based on the second user interaction occurring while the first user interaction is occurring.

Embodiments of the present disclosure may comprise or utilize a special purpose or general purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that stores computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Figure 11:
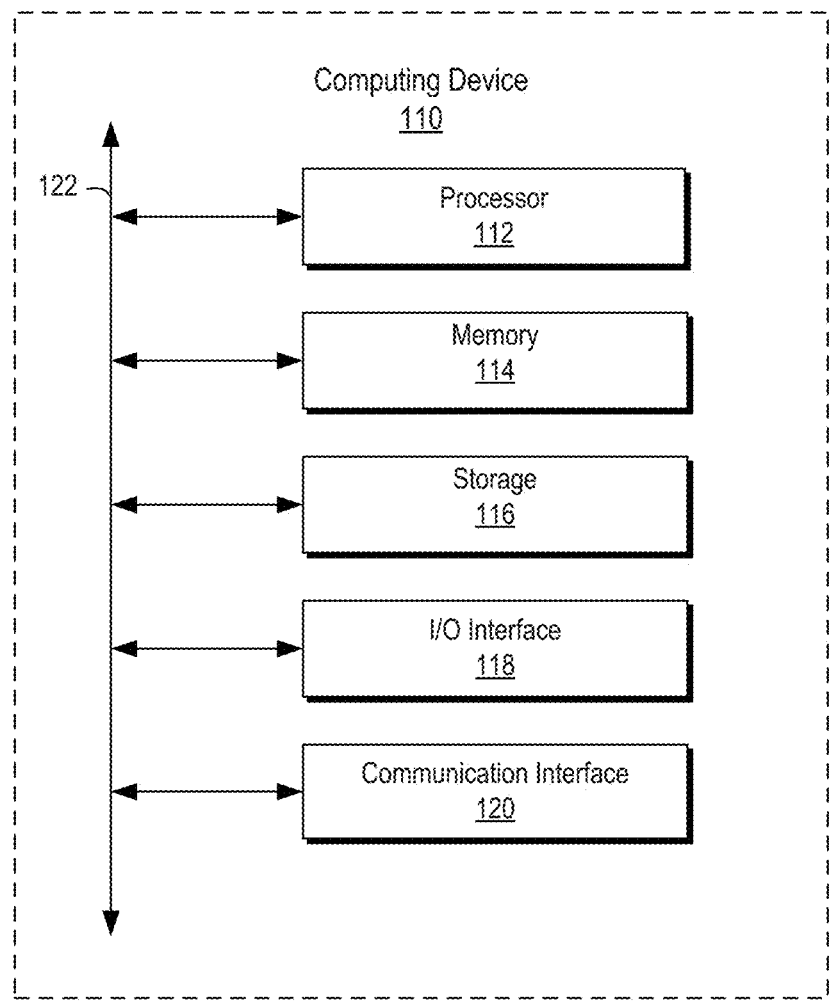
FIG. 11 illustrates a block diagram of an exemplary computing device in accordance with one or more embodiments.

FIG. 11 illustrates a block diagram of exemplary computing device 110 that may be configured to perform one or more of the processes described above. One will appreciate that one or more computing devices such as the computing device 110 may implement the VR device. As shown by FIG. 11, the computing device 110 can comprise a processor 112, a memory 114, a storage device 116, an I/O interface 118, and a communication interface 120, which may be communicatively coupled by way of a communication infrastructure 122. While an exemplary computing device 110 is shown in FIG. 11, the components illustrated in FIG. 11 are not intended to be limiting. Additional or alternative components may be used in other embodiments. Furthermore, in certain embodiments, the computing device 110 can include fewer components than those shown in FIG. 11. Components of the computing device 110 shown in FIG. 7 will now be described in additional detail.

In one or more embodiments, the processor 112 includes hardware for executing instructions, such as those making up a computer program. As an example and not by way of limitation, to execute instructions, the processor 112 may retrieve (or fetch) the instructions from an internal register, an internal cache, the memory 114, or the storage device 116 and decode and execute them. In one or more embodiments, the processor 112 may include one or more internal caches for data, instructions, or addresses. As an example and not by way of limitation, the processor 112 may include one or more instruction caches, one or more data caches, and one or more translation lookaside buffers (TLBs). Instructions in the instruction caches may be copies of instructions in the memory 114 or the storage 116.

The memory 114 may be used for storing data, metadata, and programs for execution by the processor(s). The memory 114 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 114 may be internal or distributed memory.

The storage device 116 includes storage for storing data or instructions. As an example and not by way of limitation, storage device 116 can comprise a non-transitory storage medium described above. The storage device 116 may include a hard disk drive (HDD), a floppy disk drive, flash memory, an optical disc, a magneto-optical disc, magnetic tape, or a Universal Serial Bus (USB) drive or a combination of two or more of these. The storage device 116 may include removable or non-removable (or fixed) media, where appropriate. The storage device 116 may be internal or external to the computing device 110. In one or more embodiments, the storage device 116 is non-volatile, solid-state memory. In other embodiments, the storage device 116 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 118 allows a user to provide input to, receive output from, and otherwise transfer data to and receive data from computing device 110. The I/O interface 118 may include a mouse, a keypad or a keyboard, a touch screen, a camera, an optical scanner, network interface, modem, other known I/O devices or a combination of such I/O interfaces. The I/O interface 118 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 118 is configured to provide graphical data to a display for presentation to a user. The graphical data may be representative of one or more graphical user interfaces and/or any other graphical content as may serve a particular implementation.

The communication interface 120 can include hardware, software, or both. In any event, the communication interface 120 can provide one or more interfaces for communication (such as, for example, packet-based communication) between the computing device 110 and one or more other computing devices or networks. As an example and not by way of limitation, the communication interface 120 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 120 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 710 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 120 may facilitate communications uainf various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 122 may include hardware, software, or both that couples components of the computing device 110 to each other. As an example and not by way of limitation, the communication infrastructure 122 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present disclosure is, therefore, indicated by the appended claims rather than by the foregoing description. All changes that come within the meaning and range of equivalency of the claims are to be embraced within their scope.

What is claimed is:

1. A method of responding to user input on a virtual reality headset device, the method comprising:
   receiving a user interaction from a user wearing the virtual reality headset device, the user interaction received on a touch interface that is positioned opposite an opaque display screen of the virtual reality headset device, the user interaction responsive to a cursor located at a first location;
   determining that the user interaction is dragging a finger on the touch interface;
   moving the cursor from the first location to a second location based on the dragging;
   determining that an additional user interaction with the touch interface is a tap made using another finger while the finger is still detected on the touch interface; and
   selecting an element displayed on the opaque display screen at the second location based on the tap.

2. The method of claim 1, wherein determining that the user interaction is dragging a finger on the touch interface is determined based on a length of time the user interaction occurs or on a distance of movement of the user interaction on the touch interface.

3. The method of claim 1, further comprising generating responses to pinch input to zoom and swipe input to scroll content on the opaque display screen.

4. The method of claim 1, wherein determining that the additional user interaction is a tap is based on the additional user interaction occurring after the user interaction concludes and based on a length of time the additional user interaction occurs or on a distance of movement of the additional user interaction on the touch interface.

5. The method of claim 1, wherein determining that the additional user interaction is a tap is based on the additional user interaction occurring while the user interaction is occurring.

6. The method of claim 1, further comprising generating drag and tap responses to one or more of (i) a one-finger alternative input modality and (ii) a two finger alternative input modality.

7. The method of claim 1, wherein the opaque display screen displays one or more of: (i) world-fixed content or (ii) view-fixed content.

8. The method of claim 1, further comprising:
   determining a plurality of predetermined eye positions;
   determining that a position of the user interaction on the touch interface corresponds to a location on the opaque display screen by matching the first location of the user interaction relative to one or more of the plurality of predetermined eye positions; and
   generating a response on the opaque display screen based on the location.

9. The method of claim 8, wherein determining that the position of the user interaction on the touch interface corresponds to the location on the opaque display screen comprises using one or more of (i) an absolute mapping technique and (ii) a relative mapping technique.

10. The method of claim 1, further comprising:
    displaying a selectable plurality of letter icons on the opaque display screen;
    determining a sequence of letters based on the user interaction dragging a path intersecting the selectable plurality of letter icons; and
    predicting a word based on the sequence of letters.

11. A virtual reality headset device, comprising:
    an opaque display screen secured on a first side of the virtual reality headset device;
    a touch interface secured to the opaque display screen on a second side of the virtual reality headset device, wherein the second side is opposite the first side, wherein the touch interface is configured for receiving a user interaction;
    a processor; and
    a non-transitory computer-readable storage medium storing instructions thereon that, when executed by the processor, cause the virtual reality headset device to perform operations comprising:

receiving the user interaction, via the touch interface, from a user wearing the virtual reality headset device, the user interaction responsive to a cursor located at a first location;

determining that the user interaction is dragging a finger on the touch interface;

moving the cursor from the first location to a second location based on the dragging;

determining that an additional user interaction with the touch interface is a tap made using another finger while the finger is still detected on the touch interface; and selecting an element displayed on the opaque display screen at the second location based on the tap.

12. The virtual reality headset device of claim 11, wherein determining that the user interaction is dragging a finger on the touch interface is determined based on a length of time the user interaction occurs or on a distance of movement of the user interaction on the touch interface.

13. The virtual reality headset device of claim 11, wherein determining that the additional user interaction is the tap is based on the additional user interaction occurring after the user interaction concludes and based on a length of time the additional user interaction occurs or on a distance of movement of the additional user interaction on the touch interface.

14. The virtual reality headset device of claim 11, wherein the additional user interaction is a tap is based on the additional user interaction occurring while the user interaction is occurring.

15. The virtual reality headset device of claim 11, wherein the operations further comprise generating drag and tap responses to one or more of (i) a one-finger alternative input modality and (ii) a two finger alternative input modality.

16. A non-transitory computer-readable storage medium storing instructions thereon that, when executed by a processor, cause the processor to perform operations comprising:

receiving a user interaction from a user wearing a virtual reality headset device, the user interaction received on a touch interface that is positioned opposite an opaque display screen of the virtual reality headset device, the user interaction responsive to a cursor located at a first location;

determining that the user interaction is dragging a finger on the touch interface;

moving the cursor from the first location to a second location based on the dragging;

determining that an additional user interaction with the touch interface is a tap made using another finger while the finger is still detected on the touch interface; and selecting an element displayed on the opaque display screen at the second location based on the tap.

17. The non-transitory computer-readable storage medium of claim 16, wherein the operations further comprise determining that a position of the user interaction on the touch interface corresponds to a location on the opaque display screen by matching the position of the user interaction relative to predetermined eye positions.

18. The non-transitory computer-readable storage medium of claim 16, wherein the operations further comprise:

determining a plurality of predetermined eye positions;

determining that a position of the user interaction on the touch interface corresponds to a location on the opaque display screen by matching the first location of the user interaction relative to one or more of the plurality of predetermined eye positions; and generating a response on the opaque display screen based on the location.

19. The non-transitory computer-readable storage medium of claim 16, wherein determining that the user interaction is dragging a finger on the touch interface is determined based on a length of time the user interaction occurs or on a distance of movement of the user interaction on the touch interface.

20. The non-transitory computer-readable storage medium of claim 16, wherein the operations further comprise generating drag and tap responses to one or more of (i) a one-finger alternative input modality and (ii) a two finger alternative input modality.

* * * * *